United States Patent
Inoue et al.

(10) Patent No.: US 6,313,870 B1
(45) Date of Patent: Nov. 6, 2001

(54) MODULAR PHOTOGRAPHIC FILM DIGITIZING APPARATUS

(75) Inventors: Masatoshi Inoue, Hachioji; Masao Sato, Hidaka, both of (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 08/800,542

(22) Filed: Feb. 18, 1997

(30) Foreign Application Priority Data

Feb. 21, 1996 (JP) .................................................. 8-033770
Sep. 3, 1996 (JP) .................................................. 8-233417

(51) Int. Cl.[7] .............................. H04N 1/04; H04N 5/253
(52) U.S. Cl. ................................ 348/96; 348/110; 353/95
(58) Field of Search ........................ 348/96, 110; 353/95

(56) References Cited

U.S. PATENT DOCUMENTS 4,203,657 * 5/1980 Peters ...................................... 353/26
5,726,773 * 3/1998 Mehlo ................................... 358/474
5,754,314 * 5/1998 Araki ..................................... 358/487
5,818,611 * 11/1998 Shih ...................................... 358/474

FOREIGN PATENT DOCUMENTS 9-8974    1/1997  (JP) .
9008974 * 1/1997  (JP) .

* cited by examiner

Primary Examiner—Howard Britton
(74) Attorney, Agent, or Firm—Louis Weinstein

(57) ABSTRACT

An image input apparatus with a main unit; a film holding adaptor, freely attachable or detachable to or from the main unit, for holding a film; a carriage for holding an illuminator for illuminating a film held in the film holding adaptor and an imaging unit for imaging the film illuminated by the illuminator; and an adaptor mount formed on the carriage and engaged with the film holding adaptor.

31 Claims, 12 Drawing Sheets

MODULAR PHOTOGRAPHIC FILM DIGITIZING APPARATUS

BACKGROUND OF THE INVENTION

1. Field of the Invention

The present invention relates to an image input apparatus, or more particularly, to an image input apparatus for converting an analog image into a digital image signal.

2. Description of the Related Art

In the past, an image input apparatus capable of fetching images from both a developed 35 mm film (that has widely prevailed) and a developed still photography film that is elongated and stowed in a film cartridge has been proposed in, for example, Japanese Patent Application No. 7-150553. In the image input apparatus, a film adaptor for loading the 35 mm film and a film adaptor for loading the film stowed in a film cartridge are mounted in a frame or the like of the main unit of the image input apparatus.

However, for fetching images by driving an imaging unit, illumination unit, and optical member for a sub scan, the image input apparatus encounters a problem that the precision in positioning a film surface relative to the imaging unit can hardly be attained because an adaptor mount for holding the film adaptor for loading the 35 mm film or the film adaptor for loading the film stowed in a film cartridge is attached to the frame or the like of the main unit of the image input apparatus.

OBJECTS AND SUMMARY OF THE INVENTION

A first object of the present invention is to provide an image input apparatus capable of fetching images precisely.

A second object of the present invention is to provide an image input apparatus making it possible to reduce a load imposed on an adaptor mount at the time of mounting a film adaptor.

A third object of the present invention is to provide an image input apparatus making it possible to improve positioning precision.

A fourth object of the present invention is to provide an image input apparatus making it possible to simplify attachment to a chassis as a contribution to a reduction in cost.

A fifth object of the present invention is to provide an image input apparatus making it possible to improve the precision in attachment to a chassis.

A sixth object of the present invention is to provide an image input apparatus to which dirt, dust, or the like hardly adheres and in which a contact failure can be prevented.

A seventh object of the present invention is to provide an image input apparatus making it possible to restrain a film adaptor from being mounted in a direction other than a given direction and thus prevent a film adaptor from being mounted inversely by mistake.

Briefly, an image input apparatus of the present invention comprises:
 a main unit;
 a film holding adaptor, freely attachable or detachable to or from the main unit, for holding a film;
 a carriage for holding an illuminating means for illuminating a film held in the film holding adaptor and an imaging means for imaging the film illuminated by the illuminating means; and
 an adaptor mount located on the carriage and engaged with the film holding adaptor.

These as well as other objects and advantages of the present invention will become further apparent from the following detailed explanation.

DESCRIPTION OF THE PREFERRED EMBODIMENTS

Figure 1:
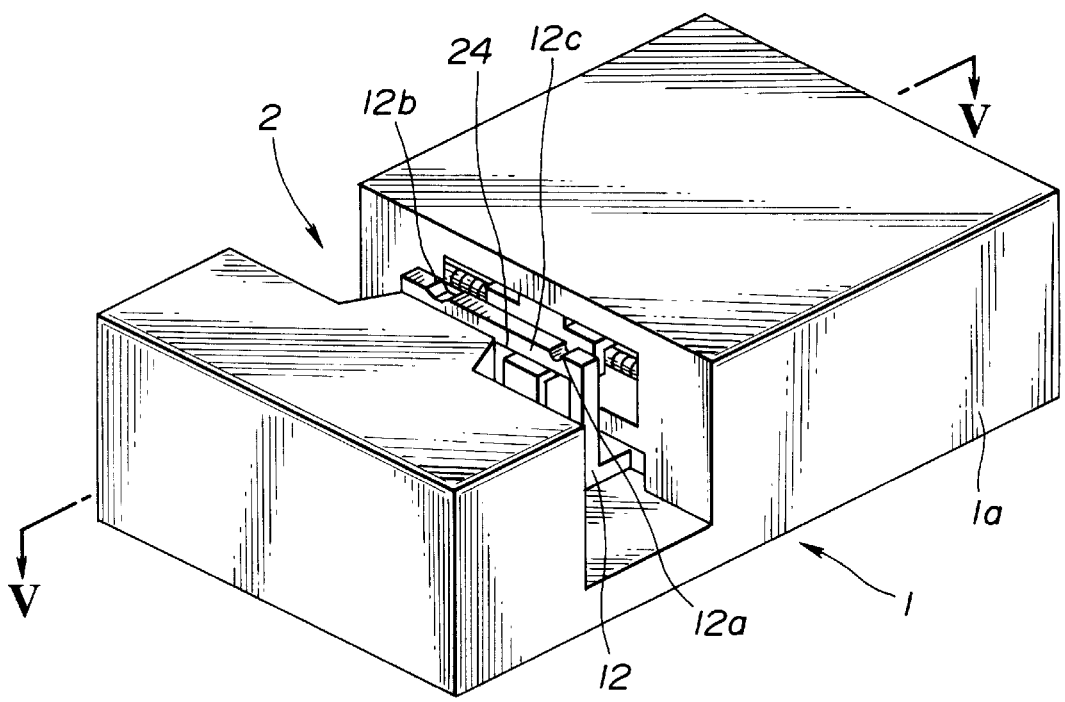
FIG. 1 is an oblique view showing the appearance of a film image input apparatus of the first embodiment of the present invention.

Referring to the drawings, embodiments of the present invention will be described.

FIG. 1 is an oblique view showing the appearance of a film image input apparatus of the first embodiment of the present invention.

Figure 2:
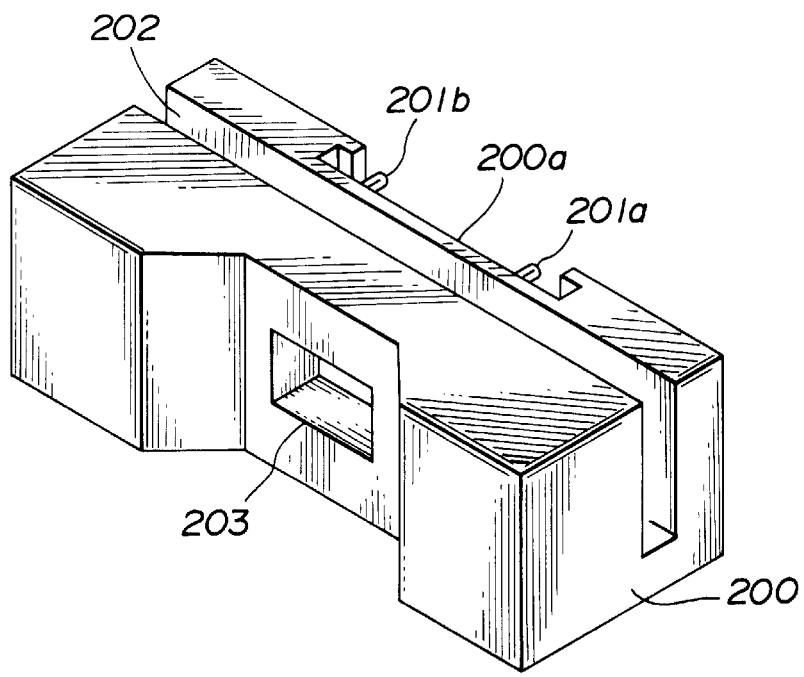
FIG. 2 is an oblique view showing the appearance of a first film holding means which is freely attachable or detachable to or from the film image input apparatus of the first embodiment and in which a first type of film can be loaded.

FIG. 2 is an oblique view of the appearance of a first film holding means (film adaptor) which is freely attachable or detachable to or from the film image input apparatus and in which a first type of film can be loaded.

Figure 3:
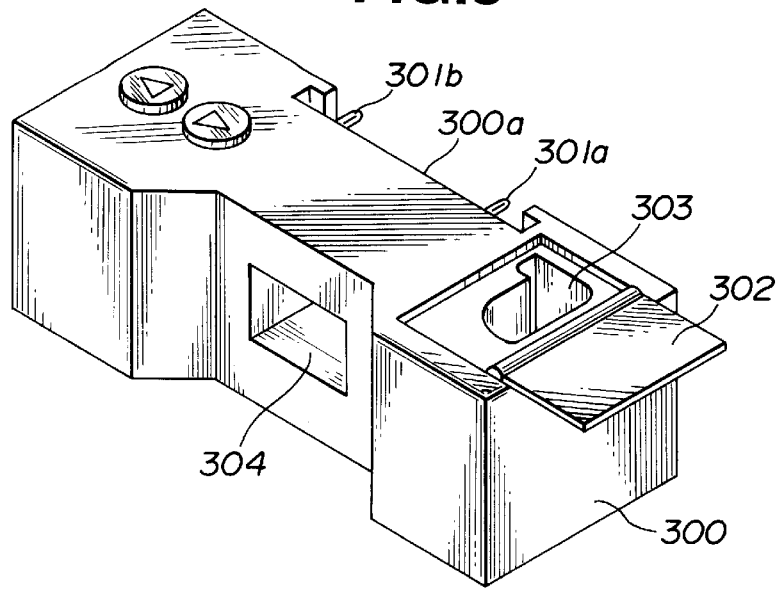
FIG. 3 is an oblique view showing the appearance of a second film holding means which is freely attachable or detachable to or from the film image input apparatus of the first embodiment and in which a second type of film can be loaded.

FIG. 3 is an oblique view of the appearance of a second film holding means which is freely attachable or detachable to or from the film image input apparatus and in which a second type of film can be loaded.

To begin with, the film image input apparatus of this embodiment will be described briefly.

The film image input apparatus 1 shown in FIG. 1 includes an illuminating means for illuminating a film that is an original, a linear CCD image sensor for reading images from a film, and an optical member for converging the images on the film on the linear CCD image sensor in a main unit 1a thereof. The film image input apparatus is an apparatus for carrying out a sub scan by moving these units in unison and converting an image on the film into a digital signal.

The film image input apparatus 1 does not have a means for holding a film inside the main unit 1a. Two film adaptors selectively attachable or detachable to or from the main unit 1a are prepared as a mechanism for holding a film. Specifically, as shown in FIG. 1, a film adaptor mounting section 2 to which the film adaptors can be mounted is formed in the middle of the main unit 1a. After a given film adaptor in which a given film that is an object of image reading is loaded is mounted in the film adaptor mounting section 2, the film images are read by a mechanism in the main unit 1a.

A plurality of film adaptors associated with a plurality of types of films can be mounted in the film image input apparatus of the first embodiment. Herein, two kinds of film adaptors will be described.

As shown in FIG. 2, a first film adaptor 200 out of film adaptors attachable or detachable to or from the film image input apparatus 1 is a first film holding means for holding a 35 mm film that is a first type slide or strip film.

The first film adaptor 200 has the same size and same contour as the film adaptor mounting section 2 of the main unit 1a and can be engaged with the film adaptor mounting section 2. Positioning pins 201a and 201b for positioning the first film adaptor 200 relative to a film adaptor mount 12 united with a chassis 11 that will be described later are fixed to the top of the first film adaptor 200 by performing caulking.

An opening 203 for illumination and imaging is formed in the center of the first film adaptor 200. Moreover, a slit 202 into which a slide film or the like to be described later is loaded is formed in the top of the first film adaptor 200. When the first film adaptor 200 is mounted in the film adaptor mounting section 2, a surface 200a of the first film adaptor 200 opposed to the film adaptor mount 12 that will be described later, abuts on the film adaptor mount 12. The details will be described later.

As shown in FIG. 3, a second film adaptor 300 of possible film adaptors attachable or detachable to or from the film image input apparatus 1 is a second film holding means for holding a second type of developed film stowed in a film cartridge.

The second film adaptor 300 has, like the first film adaptor 200, the same size and same contour as the film adaptor mounting section 2 of the main unit 1a, and can be engaged with the film adaptor mounting section 2. Positioning pins 301a and 301b for positioning the second film adaptor 300 relative to the film adaptor mount 12 united with the chassis 11 that will be described later are fixed to the top of the second film adaptor 300 by performing caulking.

An opening 304 for illumination and imaging is formed in the center of the second film adaptor 300. A cartridge film loading chamber 303 is formed on one side of the second film adaptor 300. A lid 302 is attached to an opening of the loading chamber 303 so that the lid can be opened or closed freely.

When the second film adaptor 300 is mounted in the film adaptor mounting section 2, a surface 300a of the second film adaptor 300 opposed to the film adaptor mount 12 that will be described later, abuts on the film adaptor mount 12. The details will be described later.

The film image input apparatus of the first embodiment has, as mentioned above, the illuminating means, linear CCD image sensor, and optical member, and further includes a carriage for holding and securing these units in unison. Moreover, the film image input apparatus has the adaptor mount united with the chassis, which supports and holds a lead screw for driving, supporting, and receiving the carriage and a guide shaft for supporting and receiving the carriage, via the lead screw and guide shaft. The adaptor mount holds the first and second film adaptors.

Next, the structures and movements of the film image input apparatus of the first embodiment, film adaptors, and film adaptor mount will be described in detail.

FIG. 1 is, as mentioned above, an oblique view of the appearance of the film image input unit 1, showing a state in which no film adaptor is mounted.

Figure 4:
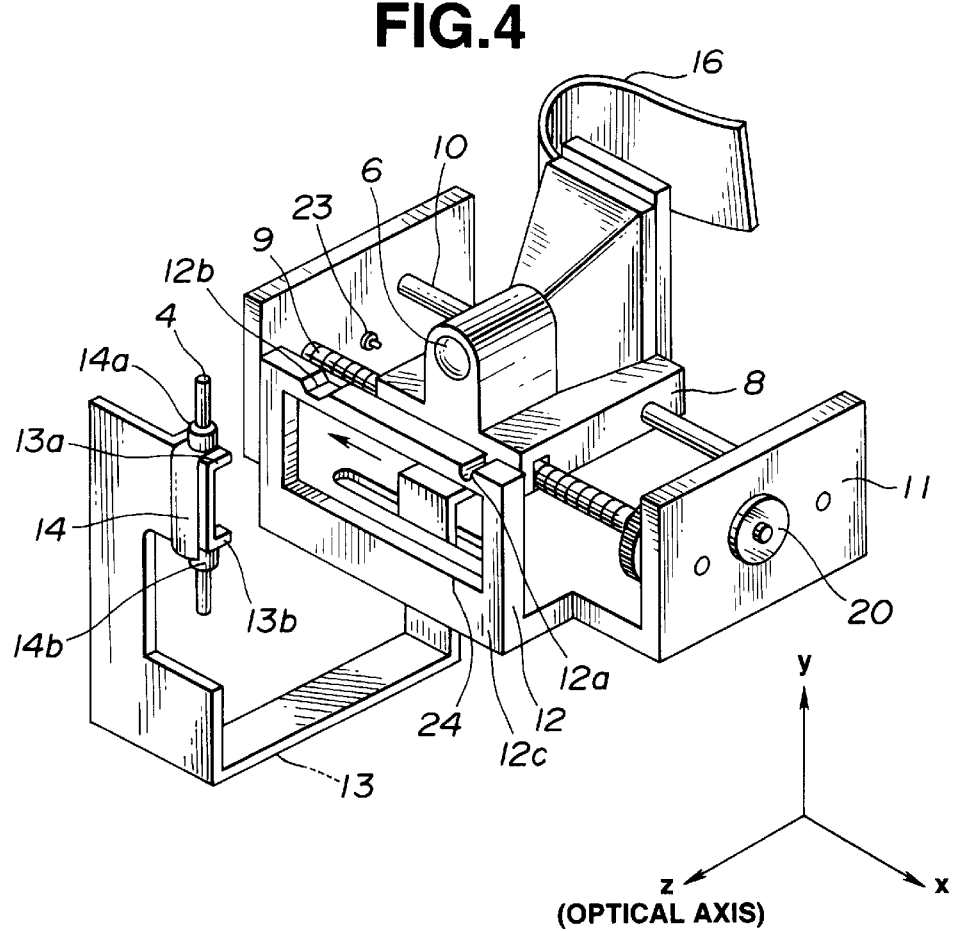
FIG. 4 is an oblique view showing a sub scan driving mechanism with a housing member of the film image input apparatus of the first embodiment omitted.
Figure 5:
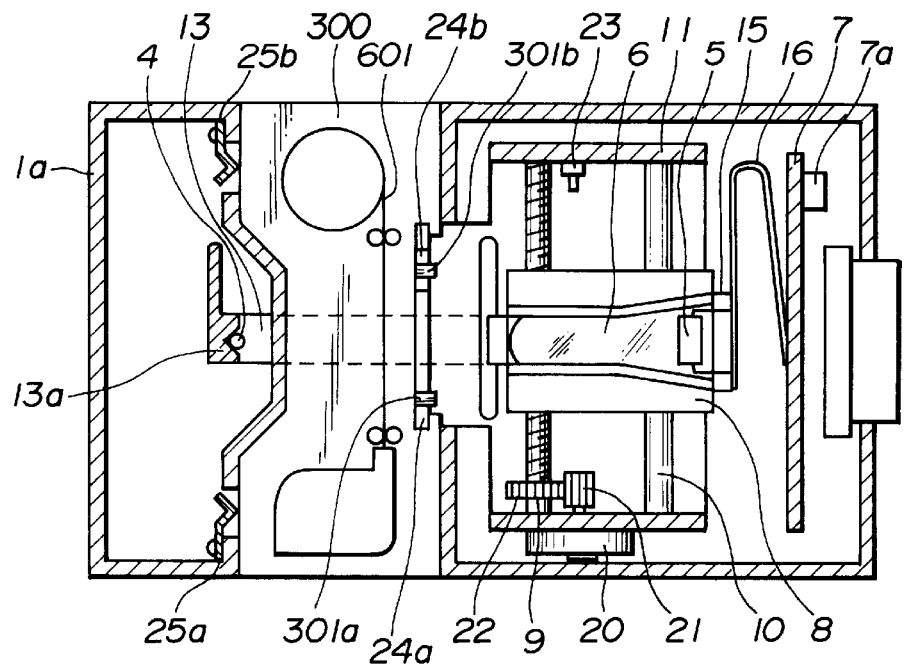
FIG. 5 is a sectional view of the film image input apparatus of the first embodiment with a second film adaptor mounted, viewing the film image input apparatus in an arrow-direction V—V of FIG. 1.

FIG. 4 is an oblique view showing a sub scan driving mechanism with a housing member (main unit 1a) of the film image input apparatus omitted. FIG. 5 is a sectional view of the film image input apparatus with a film adaptor (second film adaptor) holding a film 601 of a film cartridge 600 (See FIG. 11) mounted, viewing the film image input apparatus in an arrow-direction of FIG. 1.

As shown in FIGS. 4 and 5, a major portion of the film image input apparatus inside the film image input apparatus is composed of: a bar-shaped lamp 4 serving as an illuminating means for illuminating a film and formed as a cold-cathode tube or the like; a linear CCD image sensor 5; a lens 6 that is an optical member for converging an image on a film on the linear CCD image sensor 5; a control printed-circuit board 7 having a processing circuit for converting an output signal of the linear CCD image sensor 5 into a digital signal, a CPU 7a in which a means for controlling the whole film image input apparatus is incorporated, and the like mounted thereon; a carriage 8 that is a lens CCD holding means for holding the lens 6, CCD 5, printed-circuit board 7, and the like; a lead screw shaft 9 and guide shaft 10 located mutually parallel for supporting the carriage 8 that is a holding member so that the carriage 8 can move; a chassis 11 for supporting the lead screw shaft 9 and guide shaft 10; and a film adaptor mount 12 united with the chassis The lamp 4 is formed as a bar-shaped cold-cathode tube, and located in the center of the front part of the main unit 1a (left lower side of FIG. 4) so that the axis of the lamp 4 lies in a vertical direction. The lamp 4 is held by one end of a lamp holding member 13 shaped substantially like letter L (i.e. L-shaped). The lens 6 is located at a position opposed to the lamp 4 with the film adaptor mounting section 12 between them.

The lamp holding member 13 has the other end thereof fixed to the carriage 8. The lamp holding member 13 extends from the carriage 8 toward the front part of the main unit 1a, passes below the film adaptor mounting section 2, and then bends upward below the lamp 4 so as to be shaped like the letter L. In a distal part of the bent section of the lamp holding member 13 which is formed as if the distal part were hanging on the bent section at which the bar-shaped lamp 4 is located, a pair of projections 13a and 13b each having a V-shaped ditch jut out toward the back part of the main unit 1a.

A lamp locking member 14 having both ends thereof hollowed to a circular shape and being made of silicon rubber or the like is interposed between the pair of projections 13a and 13b. Circular holes 14a and 14b are bored in the opposite ends of the lamp locking member 14. The bar-shaped lamp 4 is inserted into the holes 14a and 14b, and the body of the lamp locking member 14 is hung on the lamp holding member 13. At the same time, the bar-shaped lamp 4 is fitted and locked in the V-shaped ditches of the projections 13a and 13b of the lamp holding member.

As shown in FIG. 5, the linear CCD image sensor 5 is fixed to the carriage 8, that serves as a lens CCD holding member by means of a screw that is not shown. The linear CCD image sensor 5, bar-shaped lamp 4, and lens 6 are aligned with one another, and held so that the direction of the line-like detection zone of the linear CCD image sensor 5 becomes parallel to an axial line passing through the linear CCD image sensor 5, bar-shaped lamp 4, and lens 6.

A printed-circuit board 15 having the linear CCD image sensor 5 mounted thereon and the control printed-circuit board 7 are linked by a flexible printed-circuit board 16 so that the printed-circuit boards can freely move relative to one another.

The carriage 8 that is a lens CCD holding member is held so that it can move only in an X direction alone (See FIG. 4) by means of the lead screw shaft 9 and guide shaft 10. The lead screw shaft 9 has both ends thereof supported by the chassis 11 shaped like a bracket so that the lead screw shaft 9 can rotate. The guide shaft 10 also has its opposite ends thereof supported by the chassis 11.

The lead screw shaft 9 has a spiral groove to which the carriage 8 that serves as a lens CCD holding member is screwed. A stepping motor 20 for driving rotation of the lead screw is attached to the chassis 11. A gear 21 fixed to the output axis of the stepping motor 20 engages with a gear 22 fixed to the lead screw shaft 9, whereby rotational force generated by the motor 20 is conveyed to the lead screw shaft 9.

The lead screw shaft 9 is rotated by driving the stepping motor 20. This causes the carriage 8 that is a lens holding member to move, in a direction parallel to the axes of the shafts 9 and 10 together with the lamp 4, linear CCD image sensor 5, and lens 6. Thus, a sub scan that is a scan in a direction orthogonal to a main scan direction or the direction of the line-like detection zone of the linear CCD image sensor 5 is carried out.

A switch 23 is attached to the chassis 11. The switch 23 is a switch for detecting as a reference for starting a sub scan by the linear CCD image sensor 5 the fact that an end of the carriage 8 serving as a lens CCD holding member has reached an initial position. The position at which the carriage 8 serving as a lens CCD holding member moves in the X-axis direction in FIG. 4 and abuts against the switch 23 is regarded as the initial position for a sub scan.

An opening 24 much larger than one frame of a 35 mm film is formed in the film adaptor mount 12 united with the chassis 11. Formed on the top of the film adaptor mount 12 are an elongated positioning notch 12a in which the positioning pin 201a or 301a of the first film adaptor 200 (See FIG. 2) or second film adaptor 300 (See FIG. 3) is fitted for achieving positioning in an X direction and Y direction (See FIG. 4), and a notch 12b in which the positioning pin 201b or 301b of the first film adaptor 200 or second film adaptor 300 is fitted.

Figure 6:
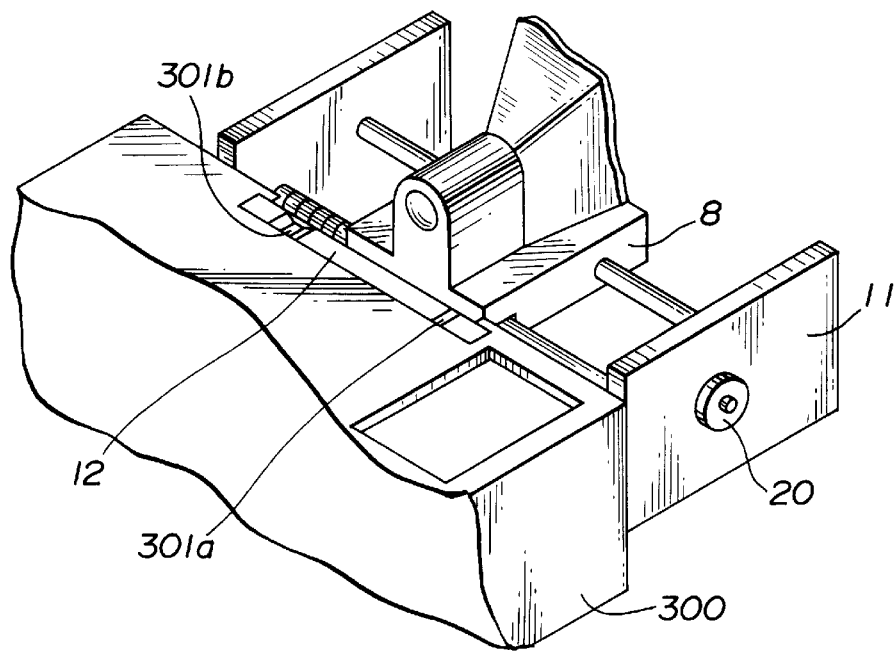
FIG. 6 is an oblique view showing the coupled state of a film adaptor for a first type of film (35 mm film) or a film adaptor for a second type of film (cartridge film) and a film adaptor mount in the film image input apparatus of the first embodiment.

FIG. 6 is an oblique view showing a coupled state of the first film adaptor 200 for the first type of film (35 mm film) or the second film adaptor 300 for the second type of film (cartridge film) and the film adaptor mount 12.

Figure 7:
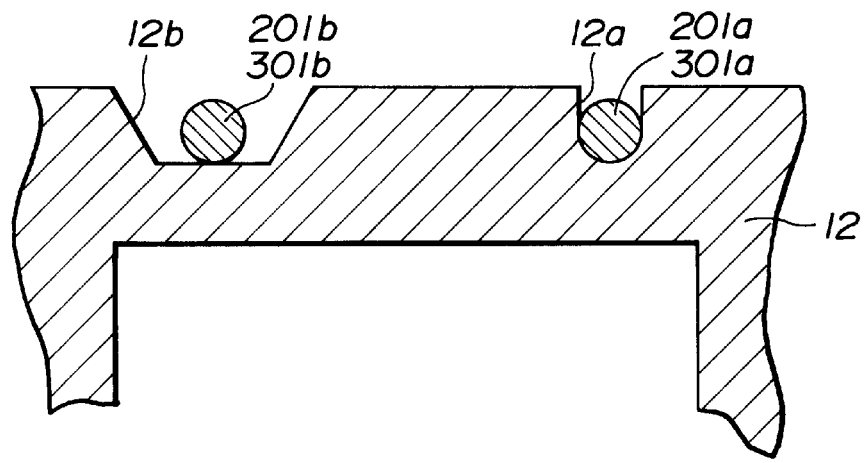
FIG. 7 is a sectional view showing the coupled state of notches formed in the film adaptor mount and positioning pins of the film adaptor for the first type 35 mm film or second type cartridge in the film image input apparatus of the first embodiment.

FIG. 7 is a sectional view showing a coupled state of the notches 12a and 12b, and the positioning pins 201a and 201b or 301a and 301b (See FIGS. 2 and 3) of the film adaptor for the first type 35 mm film or the film adaptor for the second type cartridge film.

Blade springs 25a and 25b are attached to the main unit 1a so that they are exposed to the film adaptor mounting section 2. When mounted, therefore, the first film adaptor 200 or second film adaptor 300 is urged to abut the film adaptor mount 12. At this time, a surface 200a or 300a of the film adaptor 200 or 300 that is supposed to abut on the film adaptor mount 12 abuts on a counter-film adaptor surface 12c of the film adaptor mount 12. Thus, positioning in a Z direction shown in FIG. 4 is achieved.

Figure 8:
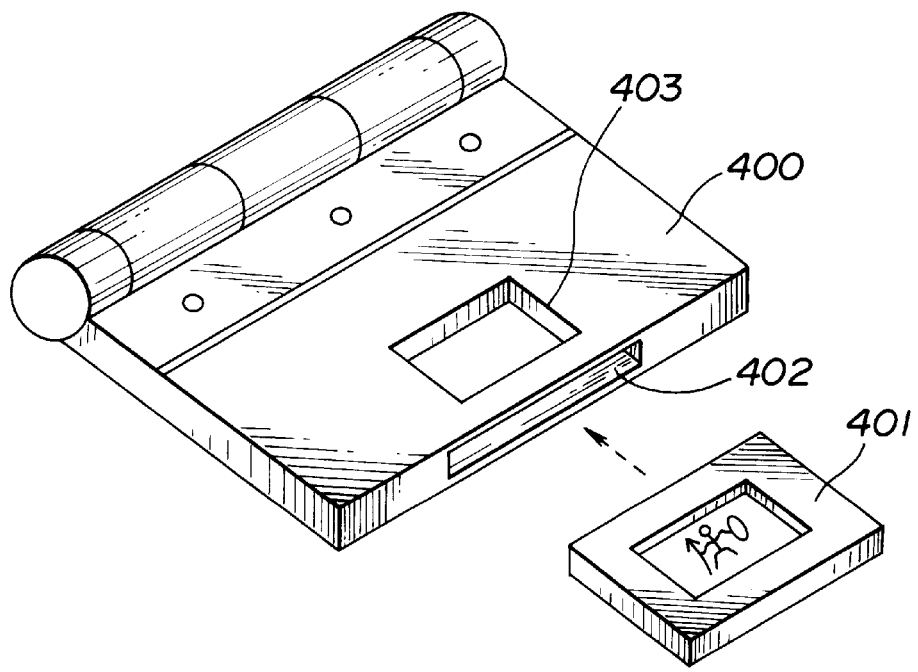
FIG. 8 is an oblique view showing a slide carrier to be loaded in the first film adaptor to be mounted in the film image input apparatus of the first embodiment.
Figure 9:
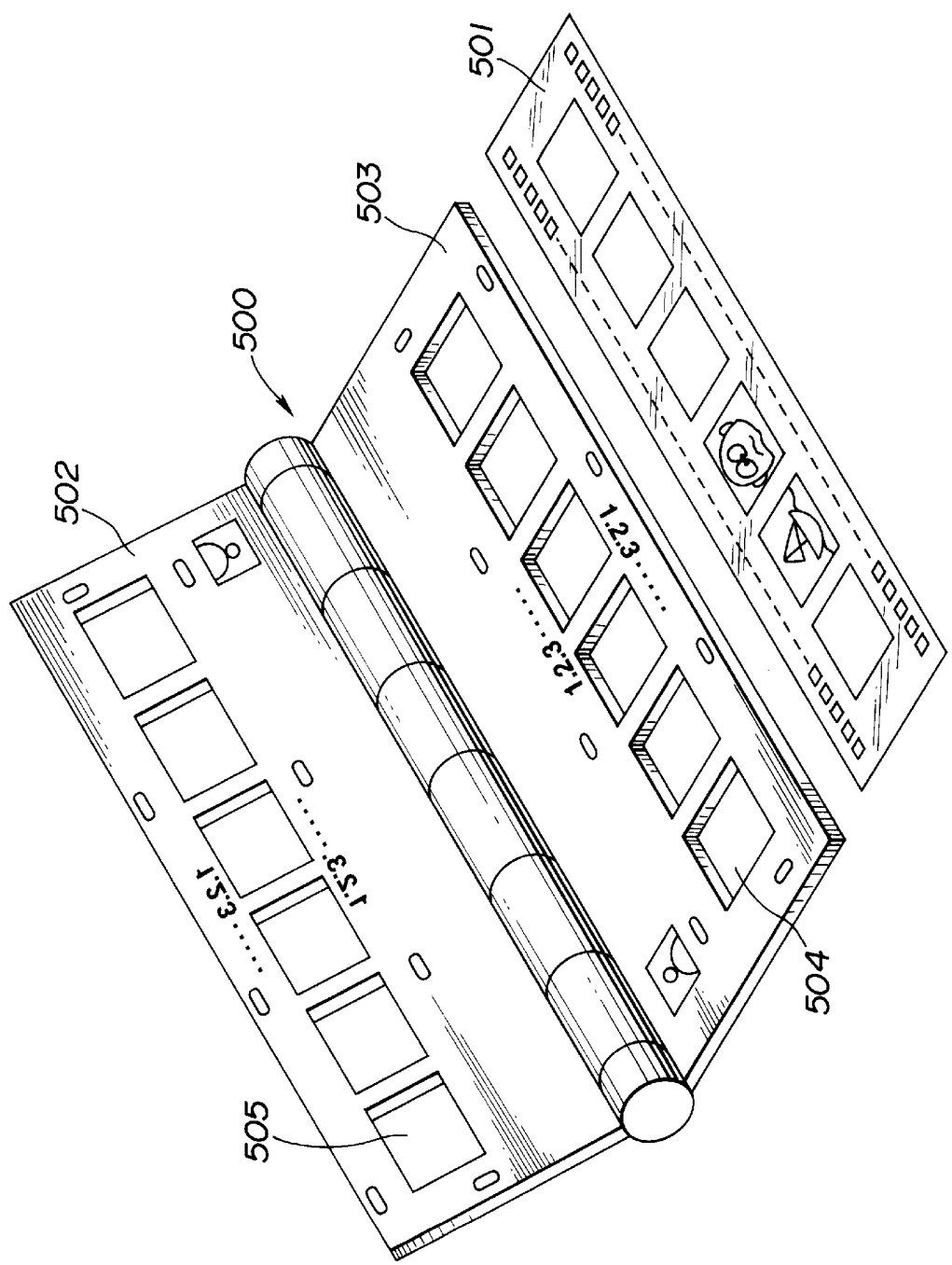
FIG. 9 is an oblique view showing an example of a strip film carrier to be loaded in the first film adaptor to be mounted in the film image input apparatus of the first embodiment.
Figure 10:
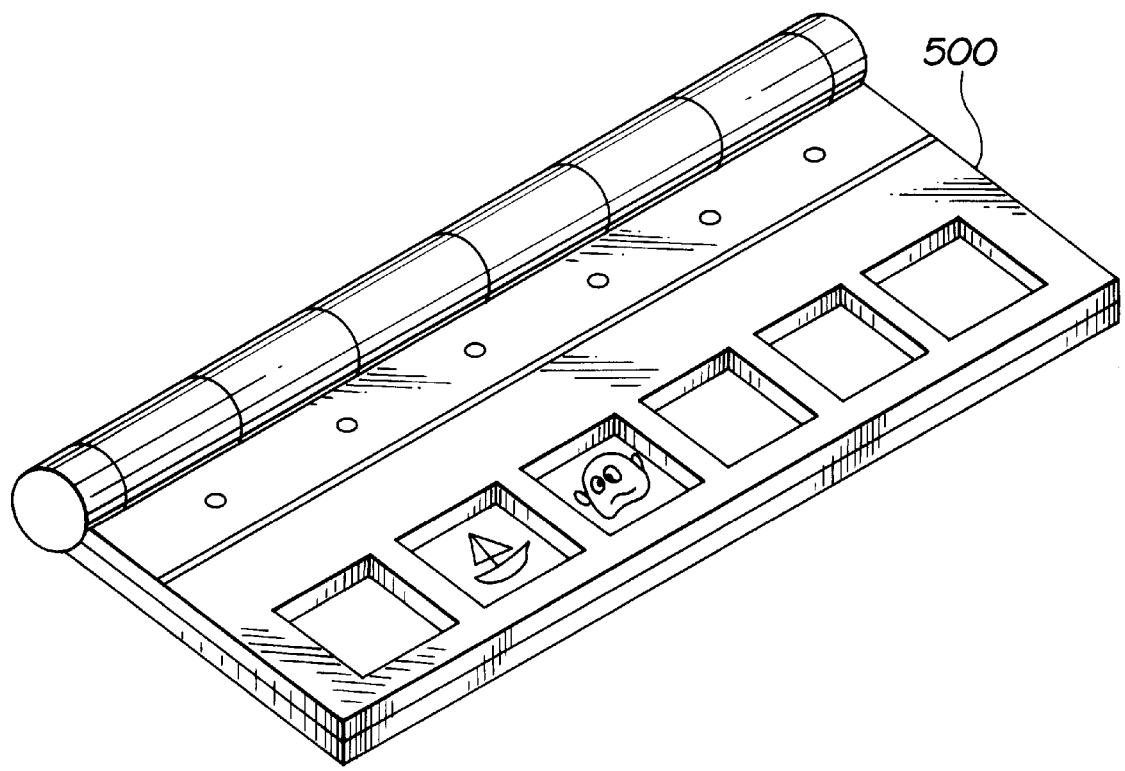
FIG. 10 is an oblique view showing another example of strip film carrier to be loaded in the first film adaptor to be mounted in the film image input apparatus of the first embodiment.

The first film adaptor 200 has the slit 202, in which a slide carrier 400 shown in FIG. 8 or a strip film carrier 500 shown in FIGS. 9 and 10 is loaded, formed in a direction orthogonal to the optical-axis direction.

As shown in FIG. 8, the slide film carrier 400 has a slit 402, into which a mounted slide film 401 can be inserted, formed therein, and also has an opening 403, of a size which is the same as the picture size of the slide film 401, formed therein.

When a strip-shaped film 501 shown in FIG. 9 is employed, the strip film carrier 500 shown in FIGS. 9 and 10 is adopted. The strip film carrier 500 is composed of two plate-like members 502 and 503 that can freely open or close with respect to a spindle. These plate-like members 502 and 503 have openings 504 and 505 each of the same size as a film picture of the strip film 501. Positioning members jut out so that when the strip film 501 is sandwiched by the plate-like members 502 and 503, the positions of frames of the strip film 501 coincide with the openings 504 and 505.

The rectangular opening 203 with the center thereof aligned with the optical axis is, as mentioned above, formed in the center of the film adaptor 200.

For fetching an image from the slide film 401 or strip film 501, the film is loaded in the slide film carrier 400 or strip film carrier 501, and then mounted in the film adaptor 200. Thereafter, the film adaptor 200 is mounted in the main unit 1a, and then imaging is carried out. Specifically, illumination light emanating from the illumination lamp 4 in the film image input apparatus 1 is irradiated to the film in the carrier through the opening 203 of the film adaptor 200, and then fetched by the linear CCD image sensor 5 via the lens 6.

Figure 11:
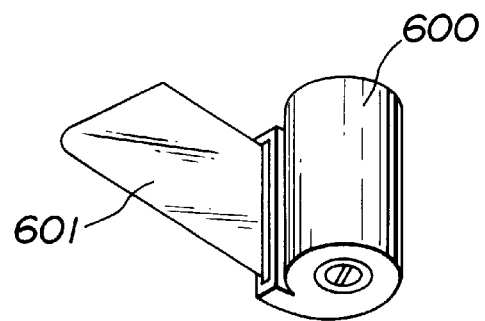
FIG. 11 is an oblique view showing a cartridge film to be loaded in the second film adaptor to be mounted in the image film input apparatus of the first embodiment.

By contrast, the second film adaptor 300 has, as mentioned above, the cartridge film loading chamber 303 (See FIG. 3) in which a cartridge film 600 shown in FIG. 11 is loaded.

For fetching an image from a film 601 of the cartridge film 600, the cartridge film 600 is loaded in the cartridge film loading chamber 303. The film adaptor 300 is then mounted in the main unit 1a, and then imaging is carried out. Specifically, in the same manner as when the first film adaptor is mounted, illumination light emanating from the illumination lamp 4 in the film image input apparatus 1 is irradiated to the film 601 through the opening 304 of the film adaptor 300, and then fetched by the linear CCD image sensor via the lens 6.

As described above, the film image input apparatus 1 for fetching images from both a 35 mm film and cartridge film comprises the carriage 8 that is a lens CCD holding means for holding the lens 6, CCD 5, printed-circuit board 7, and the like, the lead screw shaft 9 and guide shaft 10 located mutually parallel for supporting the carriage 8 serving as a lens holding member so that the carriage 8 can move, the chassis 11 for supporting the lead screw shaft and guide shaft, and the film adaptor mount 12 united with the chassis 11. The first film adaptor 200 dedicated to a 35 mm film or the second film adaptor 300 dedicated to a cartridge film is coupled with and positioned relative to the film adaptor mount 12. This results in a decreased number of parts interposed between the CCD and a film surface, and improved positioning precision.

In the first embodiment, the first type of film is a 35 mm film and the second type of film is a cartridge film. The format of the second type of film may be any format covered by Brownie film (4.5×6 cm, 6×4.5 cm, 6×6 cm, 6×7 cm, or 6×9 cm), a 46 mm format, a 70 mm format (negative/positive), a 4×5" format, a 5×7" format, or a 8×20" format. Furthermore, if a film of a new system is proposed, all that is required is to merely prepare a film adaptor associated with the film.

As described above, according to the film image input apparatus of the first embodiment, two shafts are included for supporting a carriage into which a linear CCD image sensor and an optical member for converging an image on a film on the linear CCD image sensor are integrated. A film adaptor mount is united with a chassis for supporting the two shafts. A film adaptor is directly positioned relative to the film adaptor mount. This results in the improved precision in positioning a film surface relative to a CCD.

Next, a film image input apparatus of the second embodiment of the present invention will be described.

Figure 12:
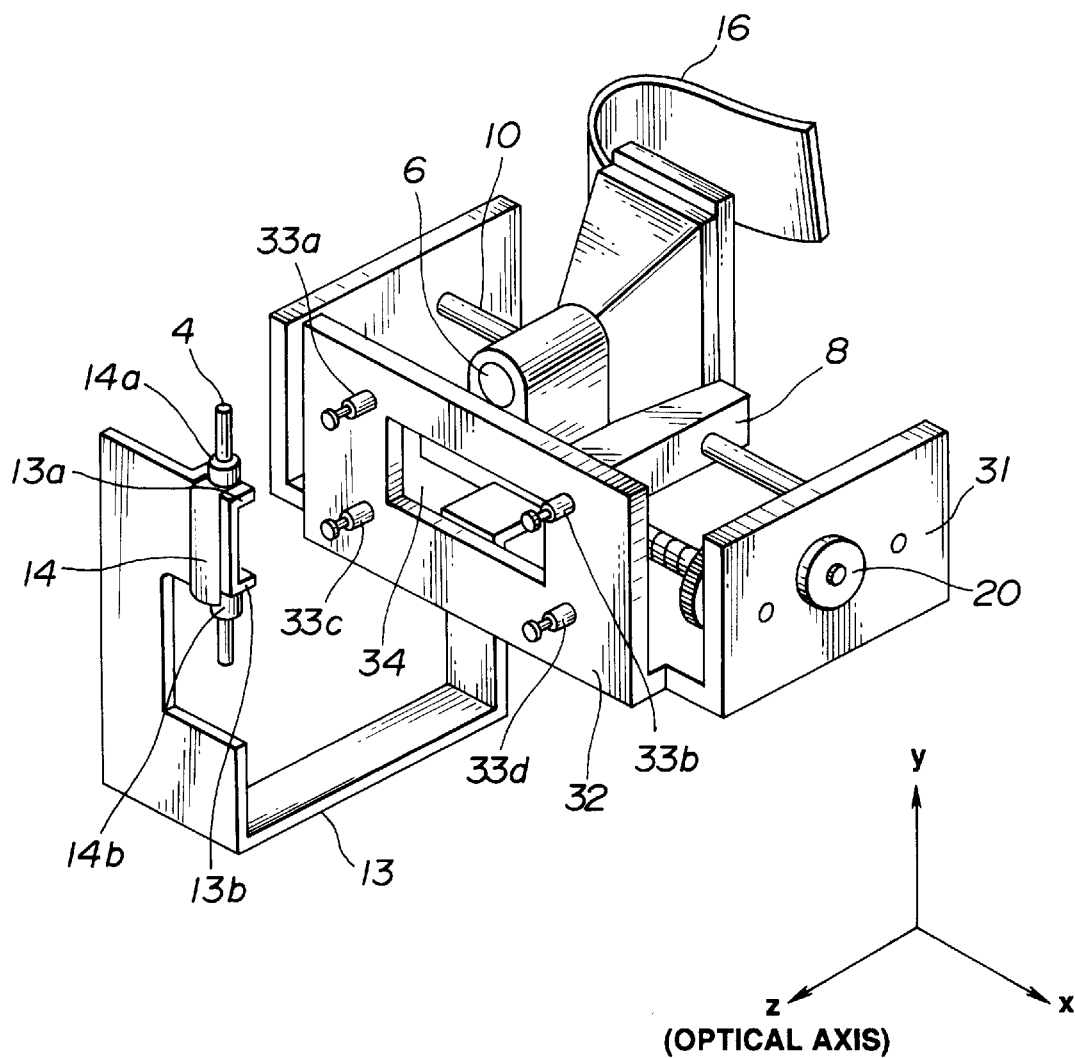
FIG. 12 is an oblique view showing a sub scan driving mechanism and adaptor mount of a film image input apparatus of a second embodiment of the present invention.

FIG. 12 is an oblique view showing a sub scan driving mechanism and adaptor mount of the film image input apparatus of the second embodiment. In the drawing, a housing member is omitted. Components identical to those of the first embodiment are assigned the same reference numerals. The detailed description of the components will be omitted.

Figure 13:
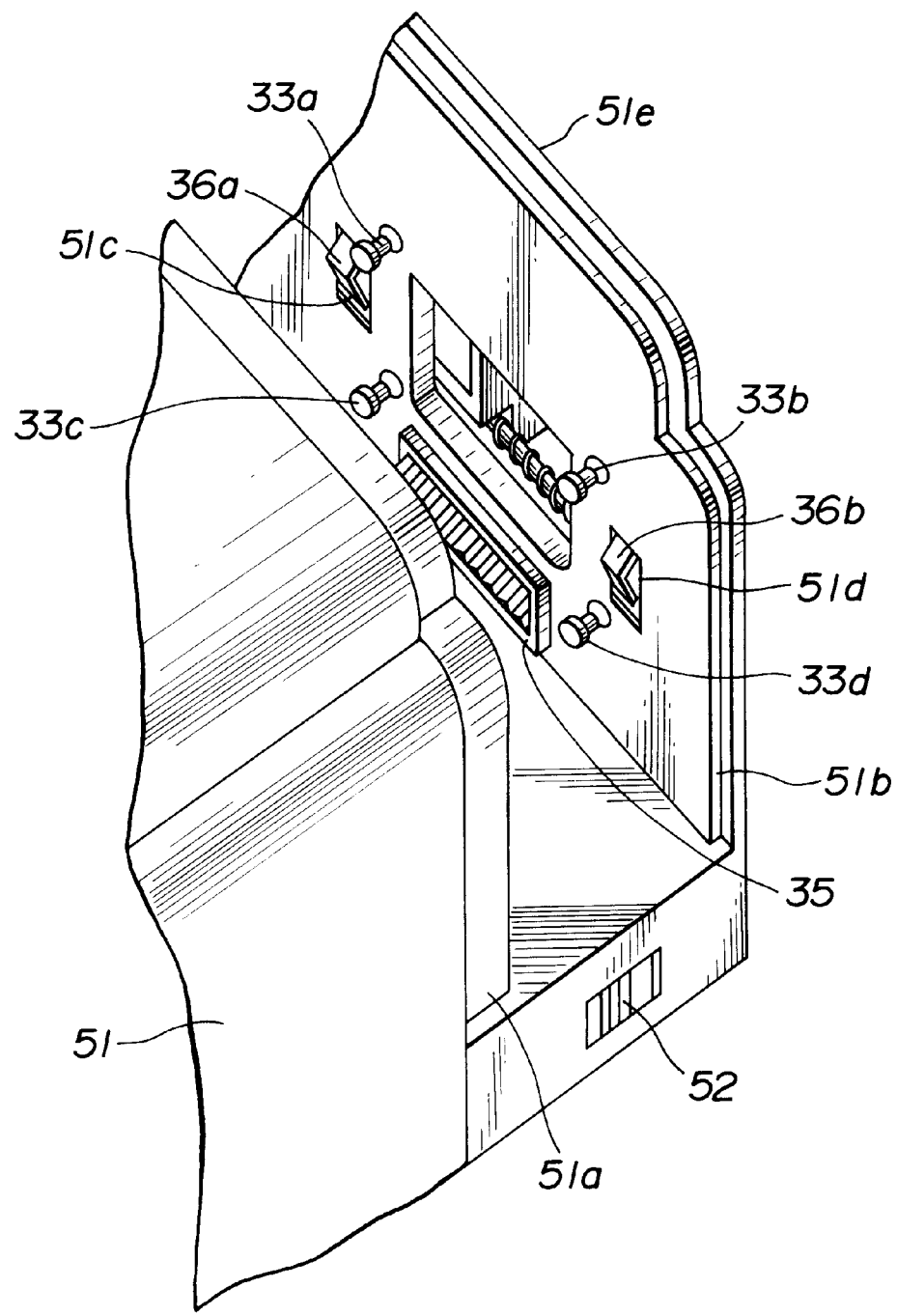
FIG. 13 is an oblique view of the appearance of the film image input apparatus of the second embodiment, showing an adaptor mount, an electrical contact unit, and their surroundings.
Figure 14:
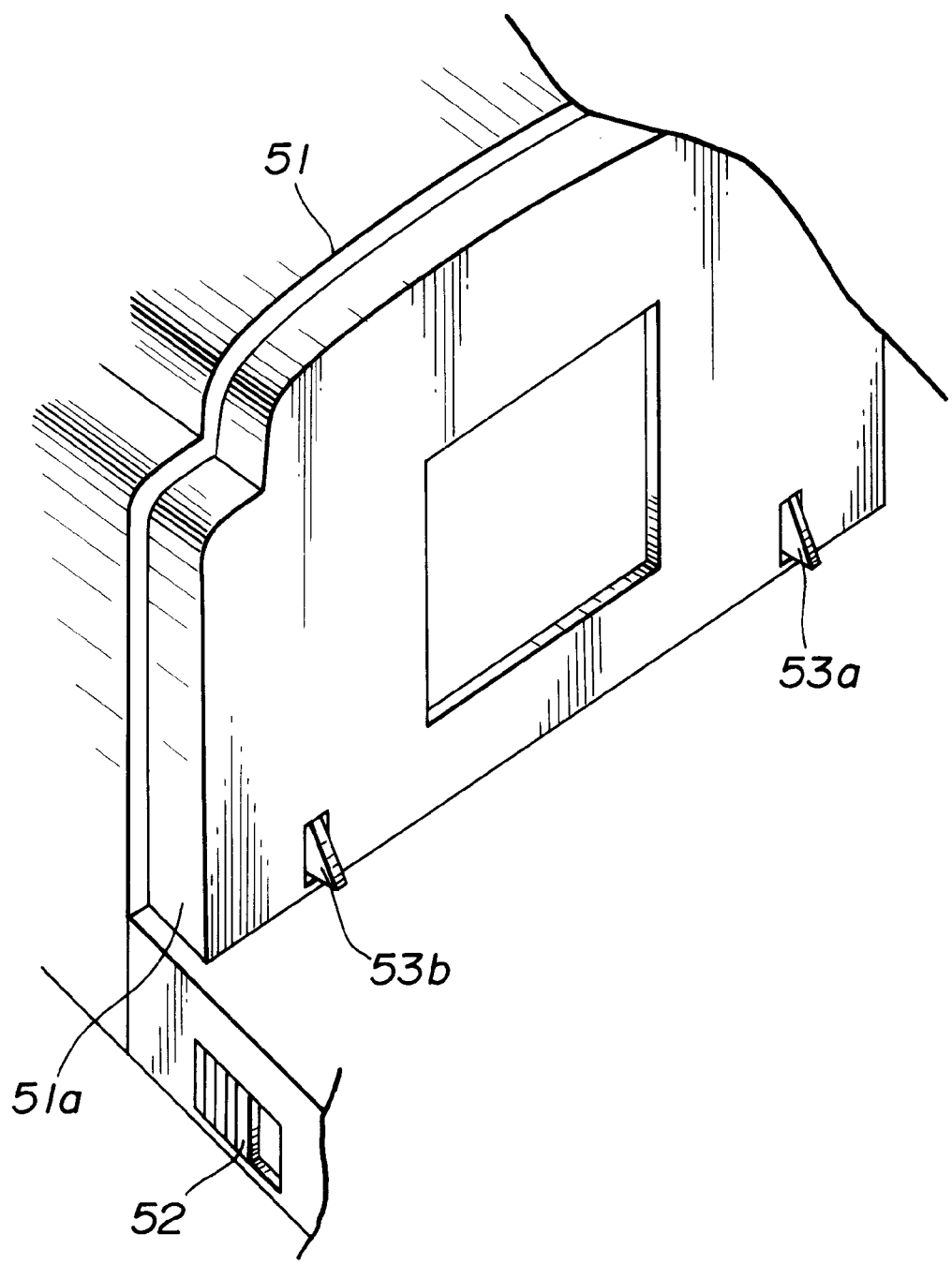
FIG. 14 is an enlarged oblique view of a major section of the film image input apparatus of the second embodiment, showing film adaptor locking/holding hooks.

FIG. 13 is an oblique view of the appearance of the second embodiment, showing an adaptor mount, an electrical contact unit, and their surroundings. FIG. 14 is an enlarged oblique view of a major portion of the second embodiment, showing hooks for locking and holding a film adaptor. FIGS. 13 and 14 show a state in which no film adaptor is mounted.

Figure 15:
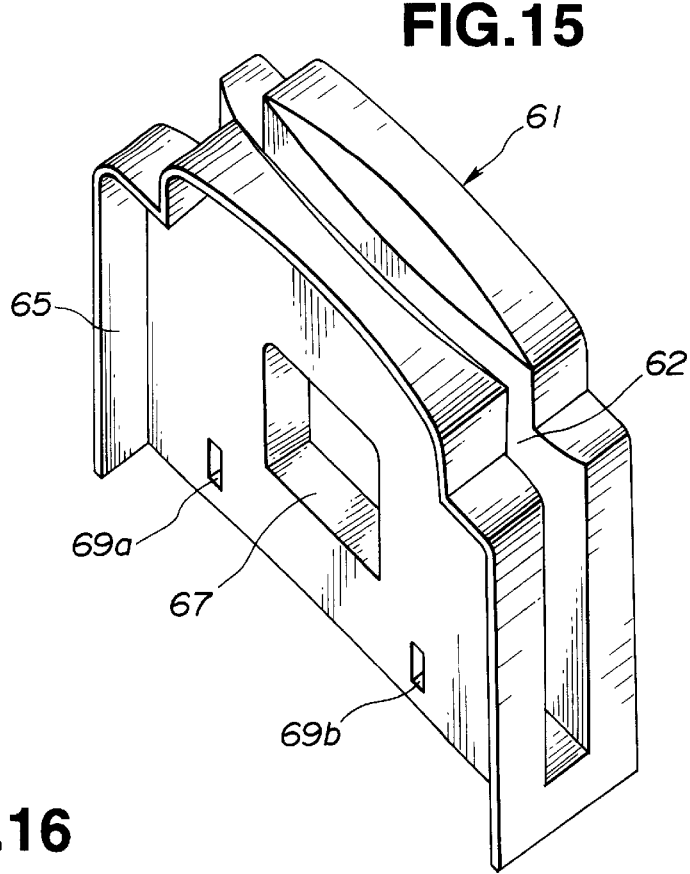
FIG. 15 is an oblique view of the appearance of the front side of a third film adaptor which is freely attachable or detachable to or from the film image apparatus of the second embodiment and in which a first type of film can be loaded.
Figure 16:
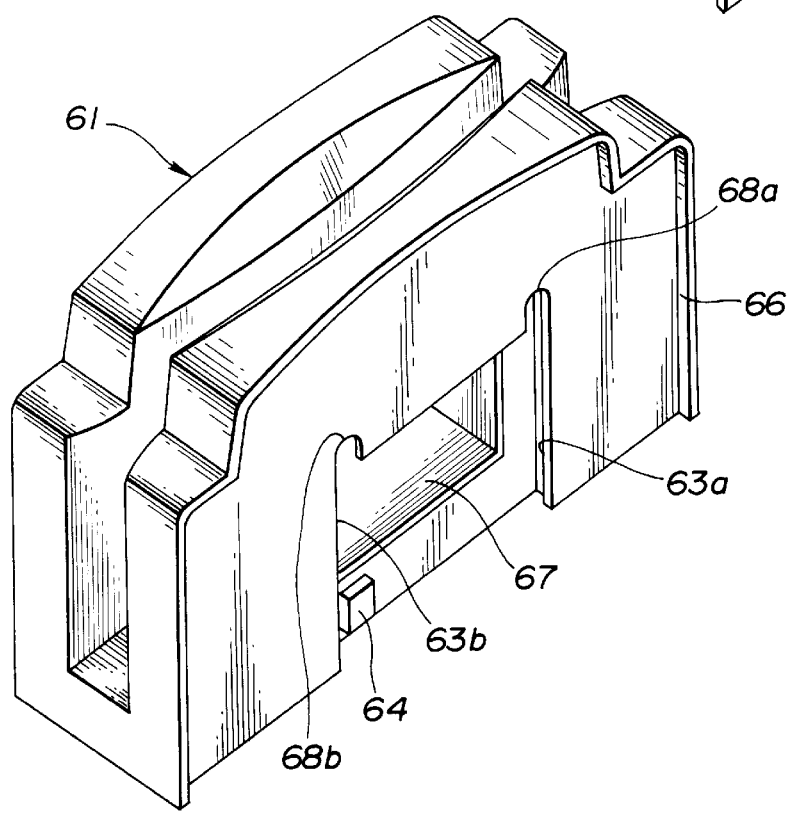
FIG. 16 is an oblique view of the appearance of the back side of the third film adaptor which is freely attachable or detachable to or from the film image apparatus of the second embodiment and in which a first type of film can be loaded.
Figure 17:
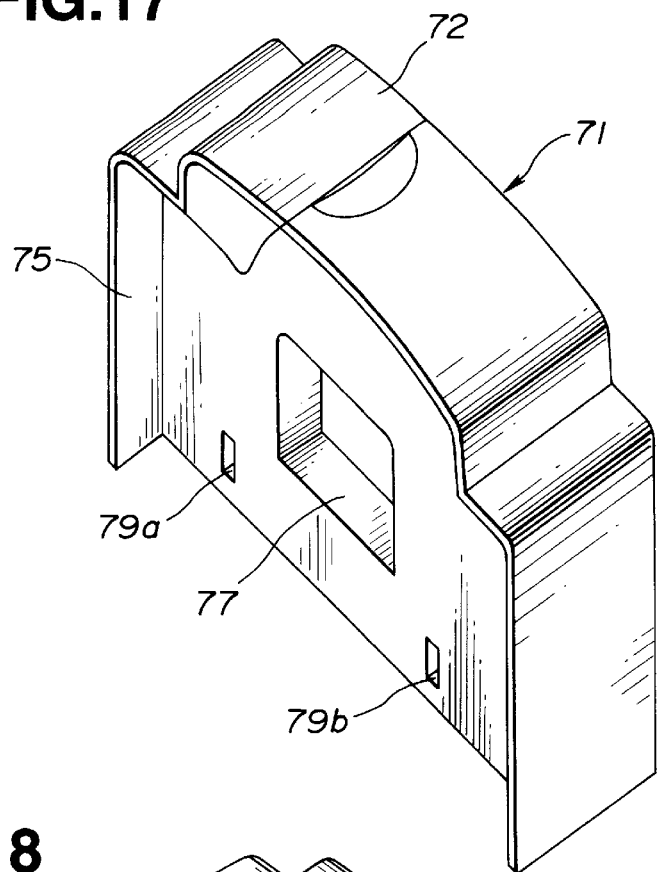
FIG. 17 is an oblique view of the appearance of the front side of a fourth film adaptor which is freely attachable or detachable to or from the film image apparatus of the second embodiment and in which a second type of film can be loaded.
Figure 18:
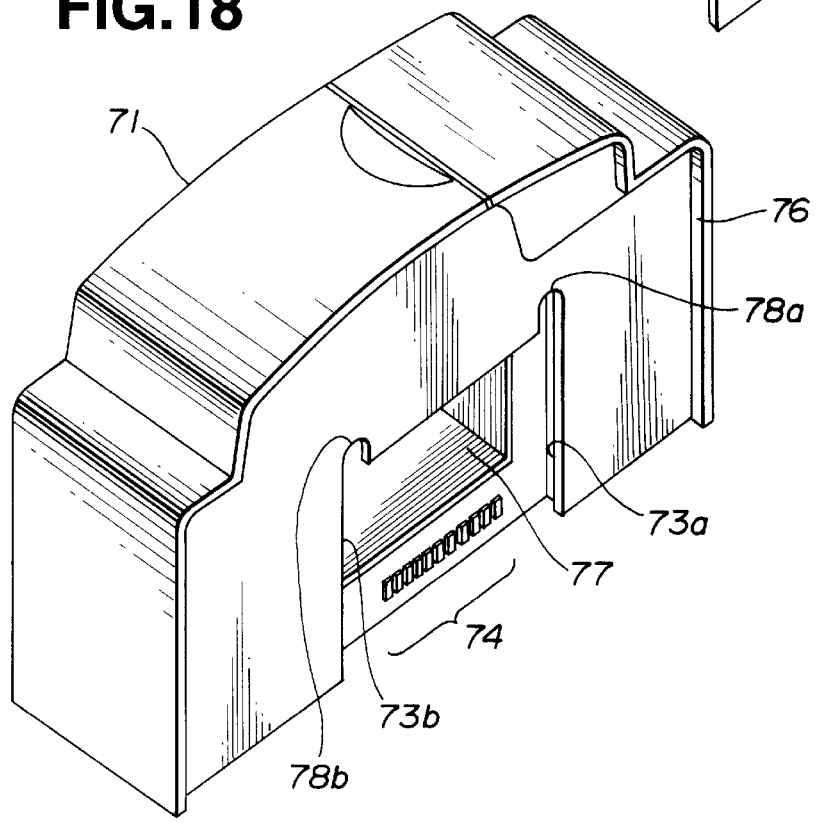
FIG. 18 is an oblique view of the appearance of the back side of the fourth film adaptor which is freely attachable or detachable to or from the film image apparatus of the second embodiment and in which a second type of film can be loaded.

FIGS. 15 and 16 are oblique views of the appearance of a third film adaptor to be mounted in the film image input apparatus of the second embodiment. FIGS. 17 and 18 are oblique views of the appearance of a fourth film adaptor.

The film image input apparatus of the second embodiment is different from that of the first embodiment in terms of film adaptors to be mounted, an adaptor mount to be engaged with the film adaptors, and an electrical contact unit to be engaged with the film adaptors. The other components are identical to those of the first embodiment. Only the differences will therefore be described. The detailed description of the other identical components will be omitted for purposes of brevity.

To begin with, film adaptors to be mounted in the film image input apparatus of the second embodiment will be described.

Even in the second embodiment, a plurality of film adaptors associated with a plurality of types of films can be mounted. Herein, two kinds of film adaptors will be described.

FIG. 15 is an oblique view of the front side of a third film adaptor which is freely attachable or detachable to or from the film image input apparatus and in which the second type of film can be loaded. FIG. 16 is an oblique view of the back side thereof. FIG. 17 is an oblique view of the front side of a fourth film adaptor which is freely attachable or detachable to or from the film image input apparatus and in which the second type of film can be loaded. FIG. 18 is an oblique view of the back side thereof.

As shown in FIGS. 15 and 16, a third film adaptor 61 attachable or detachable to or from the film image input apparatus of the second embodiment has an opening 67 for illumination and imaging formed in the center thereof. Like the first film adaptor 200, the third film adaptor 61 holds a 35 mm film that is a first type slide or strip film. Specifically, a slit 62 is formed on the top of the third film adaptor 61, and the slide film (See FIG. 8) or the like is loaded in the slit 62.

As shown in FIG. 16, guide sections 63a and 63b to be engaged with adaptor pins 33a to 33d that will be described later and locking sections 68a and 68b are formed on the back side of the third film adaptor 61 around the opening 67. A contact 64 to be connected to an electrical contact unit 35 located in the film adaptor mounting section is formed below the opening 67. The details will be described later.

A rim 65 (See FIG. 15) of the front side of the third film adaptor 61 is formed to be deeper than a rim 66 (See FIG. 16) of the back side thereof. These rims 65 and 66 are fitted on steps 51a and 51b (See FIG. 13) of the film adaptor mounting section of a housing 51. Since there is thus a difference in depth between the rims, a film adaptor is restrained from being mounted in any direction other than a given direction. It can therefore be prevented that a film adaptor is mounted inversely by mistake.

Furthermore, as shown in FIG. 15, hook receptors 69a and 69b into which hooks 53a and 53b that will be described later are fitted when the film adaptor 61 is mounted in the film adaptor mounting section of the film image input apparatus are formed in a lower part of the front side of the third film adaptor 61.

As shown in FIGS. 17 and 18, a fourth film adaptor 71 attachable or detachable to or from the film image input apparatus of the second embodiment has an opening 77 for illumination and imaging formed in the center thereof. Like the second film adaptor 300, the fourth film adaptor 71 holds a second type of developed film stowed in a film cartridge. Specifically, a film cartridge loading chamber is formed on one side of the fourth film adaptor 71. A lid 72 is attached to an opening of the loading chamber so that the lid can be opened or closed freely. The film cartridge is loaded through the opening.

As shown in FIG. 18, guide sections 73a and 73b to be engaged with adaptor pins that will be described later and locking sections 78a and 78b are formed on the back side of the fourth film adaptor 71 around the opening 77 similar in design to the back side of the third film adaptor 61. Contacts 74 to be connected to the electrical contact unit 35 located in the film adaptor mounting section are formed below the opening 77. The details will be described later.

Even in the fourth film adaptor 71, like the third film adaptor 61, a rim 75 (See FIG. 17) on the front side is formed to be deeper than a rim 76 on the back side. This provides the same advantage as the aforesaid one.

As shown in FIG. 17, hook receptors 79a and 79b into which hooks 53a and 53b that will be described later are fitted are formed in the same manner as those mentioned above in a lower part of the front side of the fourth film adaptor 71.

Next, an adaptor mount in the second embodiment will be described.

As shown in FIG. 12, the film image input apparatus of the second embodiment has a chassis 31 performing the same functions as the chassis 11 (See FIG. 4) in the first embodiment. A front chassis wall 32 having an opening 34 that is larger than one frame of a 35 mm film is hung on to the front end of the chassis 31 in the Y direction. In this embodiment, the chassis 31 is made of a material that can be pressed readily and is lightweight, for example, aluminum.

Adaptor pins 33a to 33d to be engaged with the guide sections 63a and 63b of the third film adaptor 61 (See FIG. 16) or the guide sections 73a and 73b of the fourth film adaptor 71 (See FIG. 18) jut out from the front chassis wall 32 in a forward direction, that is, in a Z direction. Among the adaptor pins 33a to 33d, the pins 33a and 33c, and the pins 33b and 33d are vertically aligned with each other so that the pins 33a and 33c can be engaged with the guide section 63a or guide section 73a, and the pins 33b and 33d can be engaged with the guide section 63b or guide section 73b.

Figure 19:
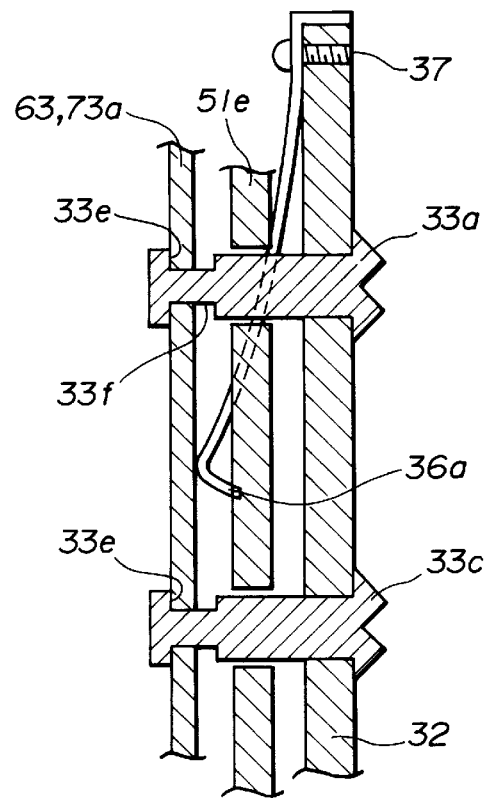
FIG. 19 is a longitudinal sectional view of a major portion of the film image input apparatus of the second embodiment, showing a plane containing the center lines of adaptor pins.

FIG. 19 is a longitudinal sectional view of a major portion, showing a plane containing the center lines of the adaptor pins 33a and 33c.

As illustrated, the adaptor pins 33a and 33c are each made of, for example, a stainless steel and are formed as solid, substantially cylindrical-shaped members. The distal parts of the adaptor pins 33a and 33c each have a small-diameter section 33f to be engaged with the guide section 63a or 73a. The tips of the adaptor pins 33a and 33c are formed as outer flanges. The proximal parts of the adaptor pins 33a and 33c are fitted into through-holes bored in the front chassis wall 32, and caulked to the back side of the front wall 32. FIG. 19 shows only the adaptor pins 33a and 33c. The adaptor pins 33b and 33d have the same structure, and the small-diameter sections of the adaptor pins 33b and 33d are similarly engaged with the guide section 63b or 73b.

A wall 51e of the housing 51 is located in front of the front chassis wall 32. Holes are bored at positions coincident with the adaptor pins 33a to 33d in the wall 51e. The adaptor pins 33a to 33d penetrate through the holes so that the distal parts thereof can jut out toward the film adaptor mounting section (See FIG. 13).

Furthermore, elastic members 36a and 36b for pressing a film adaptor are placed by the sides of the adaptor pins 33a to 33d on the front chassis wall 32. The proximal parts of the elastic members 36a and 36b are fixed to the front upper part of the front chassis wall 32 by means of screws 37. The distal parts of the elastic members are bent like the letter L (i.e. are L-shaped) and jut out toward the film adaptor mounting section through holes 51c and 51d bored in the wall 51e. When the film adaptor 61 or film adaptor 71 is mounted in the film adaptor mounting section, these elastic members 36a and 36b abut on the back side of the film adaptor 61 or film adaptor 71 and urge it to move forward.

By the way, as shown in FIG. 13, the electrical contact unit 35 is located in the lower part of the wall 51e. When the film adaptor 61 or film adaptor 71 is mounted in the film adaptor mounting section, the electrical contact unit 35 is connected to the contact 64 or contacts 64.

Figure 20:
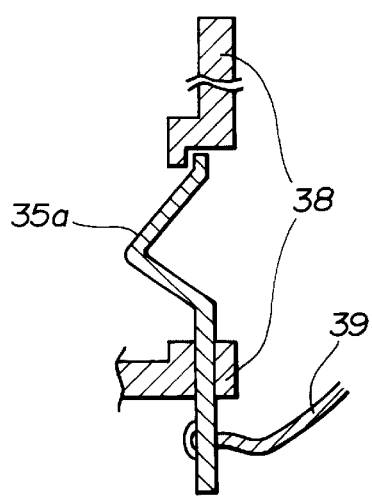
FIG. 20 is a sectional view showing a longitudinal section of an electrical contact unit in the film image input apparatus of the second embodiment.

FIG. 20 is a sectional view showing a longitudinal section of the electrical contact unit 35.

The electrical contact unit 35 is composed of a plurality of contacts 35a. The distal parts of the contacts 35a are bent like letter L (i.e. are L-shaped) and jut out toward the film adaptor mounting section. The proximal parts of the contacts 35a are locked in a frame 38 fixed to the front chassis wall 32 by means of screws that are not shown. One end of each of the leads 39 extending from a given electrical circuit in the film image input apparatus are soldered to one end of each of the contacts 35a.

As shown in FIG. 14, the hooks 53a and 53b to be fitted into the hook receptors 69a and 69b or 79a and 79b (See FIGS. 15 and 17) formed in the film adaptor 61 or 71 when the third film adaptor 61 or fourth film adaptor 71 is mounted in the mounting section are located on a front wall of the film adaptor mounting section.

The hooks 53a and 53b are movable in the optical-axis direction, and normally constrained to move backward along the optical axis by means of spring members or the like that are not shown. When the film adaptor 61 or film adaptor 71 is mounted, the tapered parts of the hooks 53a and 53b are pressed by the film adaptor, withdrawn inside the housing temporarily, and then fitted into the hook receptors 69a and 69b or 79a and 79b. The film adaptor is thus locked and held.

The locked state of a film adaptor by the hooks 53a and 53b is released responsively to the manipulation of a slide switch 52 located in a lower part of a flank of the housing 51. In other words, the hooks 53a and 53b withdraw inside the housing 51 responsive to the backward sliding of the slide switch 52. Consequently, the locked and held state of the film adaptor 61 or film adaptor 71 is released, and the film adaptor 61 or film adaptor 71 can be dismounted.

Next, mounting or dismounting the third film adaptor 61 or fourth film adaptor 71 in or from the film adaptor mounting section of the film image input apparatus having the foregoing components will be described by considering the third film adaptor 61, for instance.

When the third film adaptor 61 is mounted, the edge of the guide section 63a abuts on and slides along the small-diameter sections 33f of the adaptor pins 33a and 33c, and the edge of the guide section 63b abuts on and slides along the small-diameter sections 33f of the adaptor pins 33b and 33d. At this time, the elastic members 36a and 36b abut on the back side of the film adaptor 61 and constrain it to move forward. The inner walls of the guide sections 63a and 63b are then pressed to the back sides 33e of the flanges of the adaptor pins 33a to 33d. Thus, positioning in the optical-axis Z direction (See FIG. 12) is achieved.

As mentioned above, the edges of the guide sections 63a and 63b abut on the small-diameter sections of the adaptor pins 33a to 33d. This enables positioning in the X direction.

When the film adaptor 61 is moved downward, the small-diameter sections of the adaptor pins 33a and 33b abut on the locking sections 68a and 68b formed above the guide sections 63a and 63b. This enables positioning in the Y direction.

The bottom of the front side of the film adaptor 61 presses the tapered parts of the hooks 53a and 53b. This causes the hooks 53a and 53b to withdraw inside the housing temporarily. When mounting is completed, the hooks 53a and 53b are fitted into the hook receptors 69a and 69b. The film adaptor 61 is thus locked and held.

Furthermore, the contact 64 of the film adaptor 61 is connected to a coincident contact of the contacts 35a constituting the electrical contact unit 35.

For dismounting the film adaptor 61, the slide switch 52 is moved to slide backward. Responsive to this sliding movement, the hooks 53a and 53b withdraw inside the housing 51. The locked and held state of the film adaptor 61 is released and the film adaptor 61 can therefore be dismounted by lifting.

When the film adaptor 71 is attached or detached, the components operate in the same manner. The detailed description will therefore be omitted.

As mentioned above, the film image input apparatus of the second embodiment has the same advantage as the first embodiment as well as the advantages described below.

(1) Since an adaptor mount is composed of a plurality of cylindrical members, engagement of the adaptor mount with a film adaptor is realized with point contacts. This leads to a reduced load on the adaptor mount at the time of mounting a film adaptor.

(2) Since the adaptor mount is formed with members separate and different from a chassis, if the adaptor mount is made of a high-hardness and high-precision material, positioning precision can be improved.

(3) Since the adaptor mount is composed of cylindrical members, attachment of the adaptor mount to the chassis is simplified. This contributes to a reduction in cost.

(4) Since the adaptor mount is composed of cylindrical members, precision in attaching the adaptor mount to the chassis can be improved.

(5) Electrical contacts of the film adaptor and film adaptor mounting section are formed on flanks of members forming the film adaptor and film adaptor mounting section respectively. This hinders dirt, dust, or the like from adhering to the electrical contacts. Consequently, a contact failure can be prevented.

(6) Since there is a difference in depth between the front and back rims of a film adaptor, the film adaptor is restrained from being mounted in any direction other than a given direction. Consequently, it can be prevented that the film adaptor is mounted inversely by mistake.

In the present invention, it will be apparent that a wide range of different working modes can be formed on the basis of the invention without a departure from the spirit and scope of the invention. This invention is not restricted to any specific embodiment except as may be limited to the appended claims.

What is claimed is:

1. An image input apparatus, comprising:
   a main unit;
   a film holding adaptor, freely attachable or detachable to or from said main unit, for holding a film;
   a carriage movably supported by said main unit for holding an illuminating means for illuminating a film held in an imaging position in said film holding adaptor and an imaging means for imaging the film illuminated by said illuminating means; and
   an adaptor support mount formed on said main unit and releasably engaging said film holding adaptor to align said imaging position in said adaptor with said image sensor, said support mount extending from said main unit toward said adaptor in a direction perpendicular to said imaging position.

2. An image input apparatus according to claim 1, wherein different types of said film holding adaptors are adapted to be attached or detached for respectively holding different types of films.

3. An image input apparatus according to claim 1, wherein said film is a 35 mm film.

4. An image input apparatus according to claim 3, wherein said film is a film strip having a given length.

5. An image input apparatus according to claim 3, wherein said film is a film strip having a plurality of frames, each frame thereof mounted on a mount having a given size.

6. An image input apparatus according to claim 1, wherein said film is a type of film having a developed film stowed in a cartridge.

7. An image input apparatus, comprising:
   a main unit;
   a first film holding adaptor for holding a first film;
   a second film holding adaptor for holding a second film;
   an attaching/detaching means for selectively attaching or detaching said first film holding adaptor and second film holding adaptor to or from said main unit;
   a carriage movably mounted upon said main unit for holding an illuminating means for illuminating a film held in an imaging plane of one of said first film holding adaptor and second film holding adaptor and an imaging means for imaging the film illuminated by said illuminating means at the imaging plane; and
   an adaptor mount formed on said main unit and engaged with the attaching/detaching means of the film holding adaptor mounted thereto to align said imaging plane in said adaptor with said image sensor said support mount extending from said main unit toward said adaptor in a direction perpendicular to said imaging plane.

8. An image input apparatus according to claim 7, wherein said first film is a 35 mm film, and said second film is a type of film having a developed film stowed in a cartridge.

9. An image input apparatus according to claim 8, wherein said first film is a film strip having a given length.

10. An image input apparatus according to claim 8, wherein said first film is a film strip having a plurality of frames, each frame thereof mounted on a mount having a given size.

11. An image input apparatus, comprising:
    a first film holding adaptor capable of holding a first type of film;

a second film holding adaptor capable of holding a second type of film different in format from said first type of film;

an attaching/detaching means for attaching or detaching a selected one of said first film holding adaptor and second film holding adaptor to or from a main unit of said image input apparatus;

a carriage movably mounted upon a chassis for holding an illuminating means for illuminating a film held in an imaging plane of one of said first film holding adaptor and said second film holding adaptor and an imaging means for imaging the film at said imaging plane and illuminated by said illuminating means; and an adaptor mount formed on said chassis and engaged with the film holding adaptor mounted thereto to align said imaging plane in said adaptor with said image sensor said support mount extending from said main unit toward said adaptor in a direction perpendicular to said imaging plane.

12. An image input apparatus, comprising:

a main unit;

a film holding adaptor, freely attachable or detachable to or from said main unit, for holding a film;

a carriage for holding a film illuminating means for illuminating a film held in said film holding adaptor at an image plane and an imaging means for imaging the film at the image plane illuminated by said film illuminating means;

a carriage supporting means for driving and supporting said carriage;

a chassis for supporting or holding said carriage supporting means; and cylindrical projections formed on said chassis and engaged with waid film holding adaptor for aligning said imagine plane in said adaptor with said image sensor, said support mount extending toward said adaptor in a direction perpendicular to said imaging plane.

13. An image input apparatus, comprising:

a main unit;

a film holding adaptor, freely attachable or detachable to or from said main unit, for holding a film;

a carriage, said carriage holding a film illuminating means for illuminating a film held in said film holding adaptor and an imaging means for imaging the film illuminated by said film illuminating means;

a carriage supporting means for driving and supporting said carriage;

a chassis for supporting or holding said carriage supporting means; and projections with flanges formed on said chassis and engaged with said film holding adaptor.

14. An image input apparatus, comprising:

a main unit;

a film holding adaptor, freely attachable or detachable to or from said main unit, for holding a film;

a carriage, said carriage holding a film illuminating means for illuminating a film held in said film holding adaptor and an imaging means for imaging the film illuminated by said film illuminating means;

a carriage supporting means for driving and supporting said carriage;

a chassis for supporting or holding said carriage supporting means;

projections with flanges formed on said chassis and engaged with said film holding adaptor; and a means for positioning said film adaptor in cooperation with said projections when said film adaptor is mounted.

15. An image input apparatus, comprising:

an image input means for inputting a film image; and a film holding means releaseably attachable to said image input means and having a film imaging plane, wherein said image input means has a mount provided with an opening, and said mount releaseably said film holding means to align said imaging plane with said opening and wherein said mount juts away from said image input means and toward said film holding means in a direction perpendicular to said imaging plane.

16. An image input apparatus according to claim 15, wherein said mount has a means for pressing said film holding means against said mount.

17. An image input apparatus according to claim 15, wherein said mount has pins arranged at a plurality of points for supporting the film holding means.

18. An image input apparatus according to claim 15, wherein said pins are arranged at points about said opening.

19. An image input apparatus according to claim 15, wherein said image input means and film holding means each have connection surfaces provided with an array of electrical contacts, and said electrical contacts are mutually joined when the film holding means is supported on said mount.

20. An image input apparatus, comprising:

a main unit;

an adaptor for holding a film and presenting the film at an image plane;

an adaptor mount with which said adaptor is engaged, said adaptor mount extending away from said main unit in a direction perpendicular to said image plane; and a moveable carriage for holding an illuminating means for illuminating a film held in said film holding adaptor and an imaging means for imaging the film illuminated by said illuminating means.

21. An image input apparatus and a film holding adaptor, freely attachable or detachable to or from said image input apparatus, for holding a film, comprising:

a film holding section; and a fitting section to be fitted in the image input apparatus.

22. A film holding adaptor according to claim 21, wherein said film to be held is a 35 mm film.

23. A film holding adaptor according to claim 22, wherein said film is a film of a give length.

24. A film holding adaptor according to claim 22, wherein said film is a film strip having each frame thereof mounted on a mount having a given size.

25. A film holding adaptor according to claim 21, wherein said film to be held is a type of film having a developed film stowed in a film cartridge.

26. A film holding adaptor according to claim 21, further comprising an information transmission unit formed on one flank thereof.

27. A film holding adaptor according to claim 26, wherein when said film holding adaptor is mounted in a film holding adaptor mounting section of an image input apparatus, said information transmission unit is connected to a second information transmission unit formed on said film holding adaptor mounting section.

28. A film holding adaptor according to claim 26 or 27, wherein said information transmission unit comprises electrical contacts.

29. An image input apparatus according to claim 1 wherein said film holding adaptor has a film wind and rewind apparatus fully contained within said adaptor; for winding and rewind a film in said adaptor independently of said main part.

30. An image input apparatus according to claim 1 wherein said film holding adaptor has a film wind and rewind apparatus fully contained within said adaptor for winding and rewinding a film in said adaptor, said film holding adaptor and said main unit each having an array of contacts which are mutually engaged when the adaptor is supported on said mount.

31. An image input apparatus according to claim 1 wherein said film holding adaptor has a front rim extending outwardly from and partially surrounding a front surface of said adaptor and a rear rim extending outwardly from and partially surrounding a rear surface of said adaptor, a depth of one of said rims being greater than a depth of a remaining one of said rims, whereby said deeper rim prevents the surface which it partially surrounds from being supported by said mount when the adaptor is not properly mounted upon said image input unit.

* * * * *

UNITED STATES PATENT AND TRADEMARK OFFICE
CERTIFICATE OF CORRECTION

PATENT NO. : 6,313,870 B1
DATED : November 6, 2001
INVENTOR(S) : Inoue et al.

Page 1 of 1

It is certified that error appears in the above-identified patent and that said Letters Patent is hereby corrected as shown below:

<u>Column 14,</u>
Line 49, change "give" to -- given --.

Signed and Sealed this

Twenty-eighth Day of May, 2002

Attest:

JAMES E. ROGAN
*Attesting Officer*     *Director of the United States Patent and Trademark Office*